United States Patent [19]

Beck

[11] 3,841,700
[45] Oct. 15, 1974

[54] SEMIFINISHED UNIVERSAL AUTOMOTIVE SEAT COVER KIT FOR CUSTOM FITTED INSTALLATION

[76] Inventor: John Beck, 165 Coral Way, Broomfield, Colo. 80020

[22] Filed: Apr. 12, 1973

[21] Appl. No.: 350,329

[52] U.S. Cl. ............................................. 297/219
[51] Int. Cl. ............................................ A47c 27/00
[58] Field of Search ............ 297/218, 219, 225, 229

[56] References Cited
UNITED STATES PATENTS
2,228,948   1/1941   Field ................................. 297/229
2,313,878   3/1943   Kline ............................... 292/219 X Primary Examiner—James C. Mitchell
Attorney, Agent, or Firm—Burton, Crandell & Polumbus

[57] ABSTRACT

An automotive seat cover kit from which custom fitted seat covers can be swiftly made and installed on substantially all current makes of two or four door automobiles. Precut and presewn units consisting of woven and nonwoven panels are employed to cover the front and top surfaces of the rear seat back cushion and the front, top and back surfaces of the front seat back cushion. Separate side panels of nonwoven material to cover the side surfaces of the front seat back cushion and the side edges of the presewn front seat back cushion unit are trimmed and sewn during installation. In the case of a two door car, a precut and presewn unit of woven and nonwoven material is employed to cover the top and front surfaces of the rear seat seat cushion. In the case of a four door car, the sides of the rear seat are partially exposed, and for covering these seat cushions the kit includes a rectangular panel of woven material for covering the top of the seat cushion and two rectangular panels of nonwoven material to constitute the skirt. These three latter panels are trimmed and sewn during installation. To cover the front seat seat cushion, a rectangular panel of woven material is supplied to cover the top of the seat cushion and three separate panels of nonwoven material are supplied respectively for the front and opposite side surfaces or skirt of the front seat cushion. These latter four panels are trimmed and sewn during installation.

2 Claims, 8 Drawing Figures

SEMIFINISHED UNIVERSAL AUTOMOTIVE SEAT COVER KIT FOR CUSTOM FITTED INSTALLATION

BACKGROUND OF THE INVENTION

Replacement seat covers for automobiles (for installation over the original factory installed upholstery) are commonly installed when the original upholstery becomes stained, faded, torn or worn from usage. A person who wishes to have a set of replacement seat covers installed on his automobile normally has the option of having the seat covers custom made or alternatively of purchasing a so called boxed cover.

In the case of a custom made set of seat covers, material selected by the purchaser is cut to measure from bulk supply rolls and sewn together by the installer.

Boxed seat covers, on the other hand, are factory tailored for a specific make and model of automobile and supplied to the seat cover dealer ready for installation without further trimming or sewing in individually boxed sets — hence the term "boxed cover."

Both the custom fitted and boxed type seat cover present problems to the seat cover dealers. Where the seat cover dealer offers custom fitted installations, it is necessary for him to carry a wide variety of bolts or rolls of different fabrics in many different colors. Because panels are cut from the supply rolls for each individual installation, a substantial amount of fabric wastage is inevitable. Practically all custom seat cover installers measure and mark the materials for cutting directly from the seat cushion and this practice requires that the installer must do a fairly substantial amount of handling of the relatively large and bulky bolts of material, taking care all the time that the unused portion of the bolt does not get dirty. Reasonably skilled labor is required for the cutting and sewing operations.

While boxed seat covers can be installed easily and quickly by relatively unskilled labor, the wide variety of makes and models of cars and possible color combinations requires the dealer to maintain a massive inventory indexed as to make, model year, body style, color and type of fabric.

The present invention provides a kit for automotive seat covers which combine certain advantageous features of both types of seat cover installations discussed above, while at the same time avoiding or minimizing problems inherent in each system.

SUMMARY OF THE INVENTION

A seat cover installation kit in accordance with the present invention may be said to be universal insofar as the make and model year of the car to which it is to be applied is concerned. Because of structural differences in seat construction between two door and four door cars, the kit can not be said to be completely universal in that a different panel arrangement is required as between two door and four door cars. However, the panel dimensions and configurations of the kit are the same for all makes and model years of four door cars and the same is true for a kit for two door cars. In order to achieve this degree of universalness, a certain amount of cutting and sewing is required during installation. However, many of the individual panels of the kit are precut and presewn, these preassembled units affording a substantial saving of time and labor as compared to that required in the conventional custom fitted installation. In general, where the only exposed corner edges of the exposed surface of the cushion to be covered extend horizontally, the cover panels are precut and presewn.

The term "corner edge" is used to refer to the general location of the merger of two major surfaces of a cushion, such as the front and top surfaces, it being understood that this "edge" frequently is smoothly curved and not sharply defined. Where exposed corner edges of the cushions include vertical edges intersecting horizontal edges, separate oversized rectangular panels are supplied to be cut and sewn by the installer.

In addition to the substantial amount of time and labor eliminated by precutting and presewing the adjoining panels, in those cases where it is necessary to supply separate panels to be custom fitted, these separate panels are already precut to approximate size so that the installer works with a relatively small and easily handled panel instead of a heavy and bulky supply roll or bolt of material. This not only makes it much easier for the installer to trim the panels more accurately, but also greatly minimizes wastage of material because the kit supplier operating on a high production basis can achieve a much more efficient pattern layout when cutting from bulk material. With few exceptions, all panels of the kit are cut in rectangular shape so that substantially the only wastage of material involved is that resulting from the trimming of rounded corners during installation.

While a reasonable amount of skill is required in the cutting and sewing operations, a skilled operator using the kit of the present invention can cut, sew, and completely install a set of seat covers in less than one hour as opposed to the three hours or more which the same installer would require to tailor and install a set of custom fitted covers in accordance with conventional practice.

As compared to boxed seat covers, the present invention drastically reduces the inventory problem because the same kit fits all makes and model years.

Other objects and features of the invention will become apparent by reference to the following specification and to the drawings.

IN THE DRAWINGS

Figure 1:
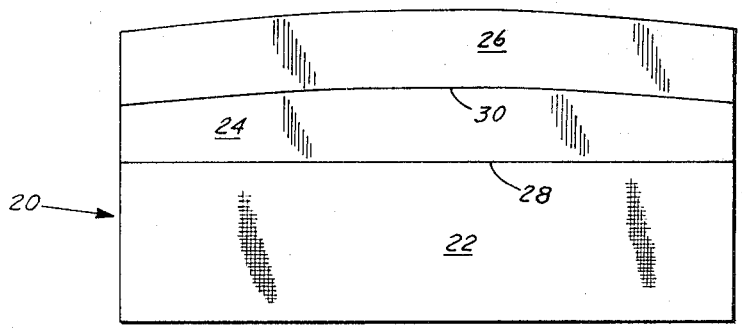
FIG. 1 is a plan view of a rear seat back cover panel unit.

Before describing the components of the seat cover kit in detail, it may be noted that the most common type of seat cover presently in use is made up of two types of fabric material with the major portion of the seat and back cushions being covered with a woven fabric material, while the seat skirts and the top portion of the back cushions are covered with a nonwoven material, usually of vinyl or some other smooth surfaced leatherlike material. To indicate, in the drawings, those panels conventionally made of woven fabric material, crossed line shading has been applied, while those panels made of a smooth surface (usually vinyl) material have been shaded by a slanted line.

Because the seat cover kit disclosed in the drawings is intended to be usable on all makes and models, the dimensions of the panels as supplied in the kit are chosen to be adequate to cover the largest dimensions of cushions which will be encountered.

In an attempt to simplify the description, in the following description the word "back" is employed to identify the upright cushion while the word "rear" is used to establish reference to the rear seat assembly. The term "seat" is used to refer to the generally horizontal seat cushion. However, during installation, the cushions are completely removed from the car; the term "exposed" surface is employed to refer only to those surfaces of the cushion which are exposed to view when the cushions are installed in the car.

Referring now to FIG. 1, there is shown in plan or layout a panel unit or assembly designated generally 20 for covering the rear back cushion. Rear back panel unit 20 is equally adaptable for covering the rear back cushion of either two door or four door cars and includes a main panel 22, usually of woven fabric, a shoulder panel 24 and a top panel 26. Main panel 22 is of rectangular configuration and is seamed along its upper edge at seam 28 to the straight lower edge of shoulder panel 24. The upper edge of shoulder panel 24 is not straight, but is formed with a relatively shallow upwardly convex curve, this edge being joined to a complementary curved edge of top panel 26 along seam 30. The curved configuration of seam 30 is employed because of the fact that the front surface of the seat back cushion is bulged outwardly — that is, the cushion is thicker in the middle than along the vertical side edges. By extending seam 30 along the curved path indicated in FIG. 1, seam 30 appears to be perfectly horizontal when the cover is applied to the cushion.

The panel unit 20 for the rear back cushion can be precut and presewn because the exposed surfaces of this cushion consists only of the front and top surface of the cushion and there is thus no requirement that a three-surfaced corner be snugly fitted.

Panel 20 is installed on the rear back cushion in the conventional manner by stretching panel unit 20 across the cushion and clipping the panels with hog rings to the cushioned springs at the rear or concealed side of the cushion. While some folding or manipulation of the panel material is required in drawing the material rearwardly around the upper and lower corners of the cushion, these regions are concealed when the cushion is mounted in place in the automobile.

REAR SEAT

Figure 2:
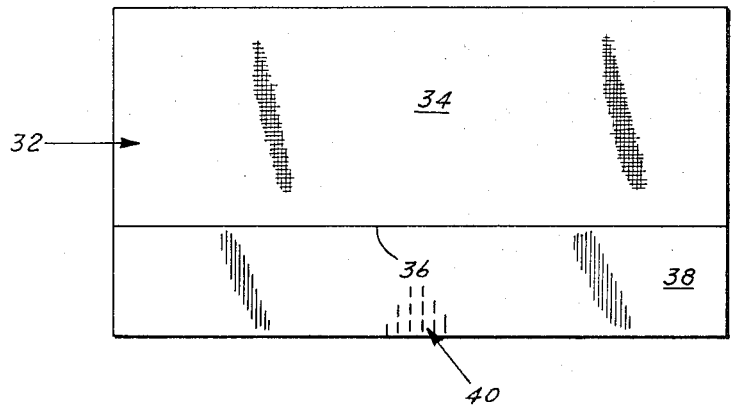
FIG. 2 is a plan view of a rear seat seat cover unit for a two door automobile.

In the case of a two door automobile, the only exposed surfaces of the rear seat cushion are its top and front side surface. Thus, the rear seat cushion cover for a two door automobile, shown in FIG. 2 and designated generally 32 may likewise be precut and persewn. Panel unit 32 consists simply of a rectangular main seat panel 34 joined by a seam 36 along one of its longer edges to a skirt panel 38. Panel unit 32 is hog ringed onto the rear seat cushion in a conventional manner. In some instances it may be desirable to slit the lower center portion of panel 38 as generally indicated at 40 to permit smooth coverage of the lower seat skirt where it is recessed to clear the drive shaft tunnel.

The rear seat cushion of a four door sedan is exposed not only on its top and front surfaces, but also for some extent along the side surfaces of the cushion. The term "three-surfaced corner" is employed to refer to the region of juncture of three major exposed surfaces of a cushion, such as the corner defined at the region of merger of the top, front and a side surface of the cushion. Because of the exposure of the side surfaces, it is necessary to fit this rear seat cover to obtain a snug smooth fit at the forward corners of the seat. To enable this fitting, for four door automobiles, the kit finds the rear seat cushion cover being supplied as three separate rectangular panels, a main seat panel 42 and two skirt panels 44a and 44b. Panels 44a and 44b may, if desired, be supplied as a single continuous panel instead of two separate panels, however, the use of two smaller panels will normally give greater economy in cutting in large quantities and the central seam 46 employed to join the two panels to each other provides a convenient reference mark in sewing the skirt panels to main panel 42.

Figure 3:
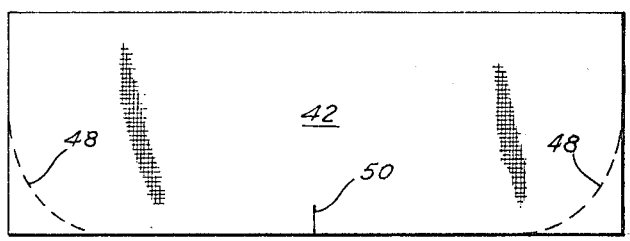
FIG. 3 is a plan view of the three components employed to cover the rear seat seat of a four door automobile.
Figure 3:
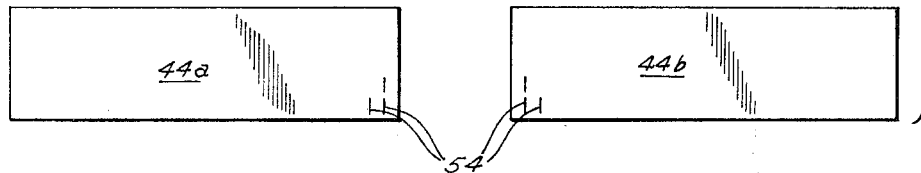

Practically all rear seat cushions in four doors automobiles are formed with rounded front corners to avoid sharp projections where the seat projects into the rear door opening. Thus, in employing the kit of the present invention it is necessary to mark and cut main panel 42 to fit. This is conveniently done by laying main panel 42 down on the rear seat cushion, placing its front edge along the seam which conventionally extends horizontally along the front edge of the seat cushion and tracing the curved continuation of this front seam on front panel 42 in chalk as indicated at 48 in FIG. 3. Panel 42 is then cut to shape by trimming along marks 48.

Figure 4:
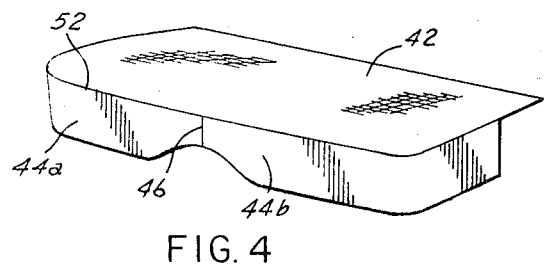
FIG. 4 is a perspective view of the components of FIG. 3 in their final assembled configuration.

In most cases, the original factory installed upholstery has a vertical center seam in the front skirt which enables a chalk mark to be made at 50 to assist in aligning the main panel with skirt panels 44a and 44b. Panels 44a and 44b are then joined together by seam 46 (FIG. 4) and the assembled panels 44a and 44b are then seamed to main panel 42, after which the assembled unit is installed on the rear seat cushion in a conventional manner. Trimming of panels 44a and 44b is usually not necessary, although it may be convenient to cut slits as at 54 for smooth coverage of the front skirt of the region of the drive tunnel recess.

In covers of this type, when seams are formed it is conventional to sew a piece of welting into the seam between the joined panels.

FRONT BACK

Figure 5:
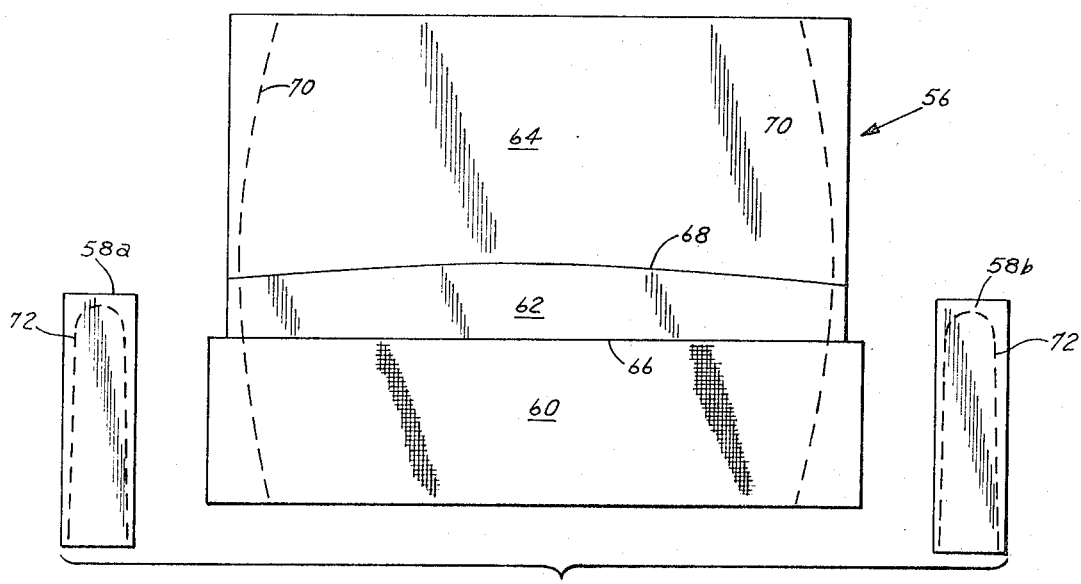
FIG. 5 is a plan view of the components employed to cover the front seat back cushion of a four door automobile.

The kit components for a front back cushion cover for a four door automobile are shown in FIG. 5 as including a precut and presewn panel unit designated generally 56 and a pair of separate side panel blanks 58a and 58b. Main panel unit 56 is employed to cover the front, top and back surfaces of the front back cushion, and since these surfaces, by themselves, do not involve any three surface corners, panel unit 56 can be precut and presewn. Panel unit 56 includes a main panel 60, usually of fabric, a shoulder panel 62 and a main back panel 64. As was the case with the rear back panel unit 20, panels 60 and 62 are joined by a straight edge seam 66 while the seam 68 joining panels 62 and 64 is curved convexly upwardly to accommodate the conventional normally present central bulging of the seat cushion. The panel unit is marked for trimming by draping the panel unit over the front back cushion with seam 68 extending along the juncture between the top and front surfaces of the cushion. The panel unit 56 is then marked for cutting as at 70 by tracing with chalk the original factory installed seam on the cushion along the front top and rear side edges of the cushion. Panel 56 is then removed from the cushion and side panel 58a and 58b are correspondingly marked as at 72. The panels are then cut and sewn together to form an envelope like assembly which may be slipped downwardly over the front seat cushion, stretched and hog ringed into place.

Figure 6:
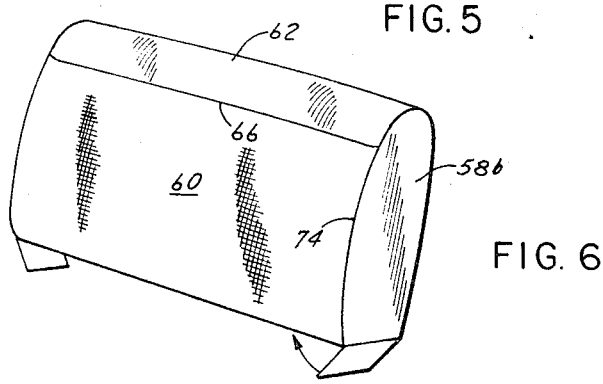
FIG. 6 is a perspective view showing the completed front seat back cover.

FIGS. 5 and 6 show a front back cover for a four door automobile.

For a standard two door automobile, the seat back cushion is split, rather than continuous so that the seat backs may be tilted forwardly for access to the rear seat of the car. The kit for a two door automobile finds the front back covering with two sets of side panels and two main panel units 56. Because of the central bulging of the seat backs, it is not possible to cover the two separate seat backs of a two door automobile by merely splitting main panel 56 vertically and supplying an extra set of side panels. The curvature of the top seam 68 must be symmetrical and therefore, in the case of the two door two panel units 56 of a width approximately one-half of that shown in FIG. 5 and two sets of side panels are supplied.

Figure 7:
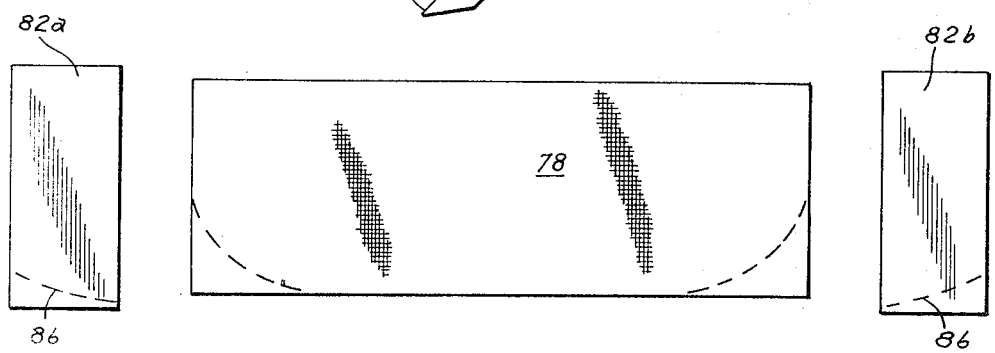
FIG. 7 is a plan view of the components employed to cover the front seat seat.

Like the rear seat construction of a four door car, the side, front and top surfaces of the front seat cushion are all exposed and thus the seat cover requires fitting, particularly at the front corners. The units for covering the front seat are shown in FIG. 7 and include a main panel 78 for covering the top surface of the cushion, a front skirt panel 80 and side skirt panels 82a and 82b. Main panel 78 is marked and cut in the same fashion as was main panel 42 of the rear seat cover.

In the case of the front seat, the skirt panels are originally supplied in three pieces because of the fact that in the usual case the front seat surface tapers rearwardly and the two side surfaces taper inwardly, thus usually requiring some tapered trimming at the abutting edges of the side and front skirt panels as indicated at 84 and 86. The fact that the top surface of the front seat normally slopes downwardly toward the rear is an additional requirement for this three piece construction since if a single piece were wrapped smoothly around the corner, it would tend to incline upwardly toward the rear along the sides of the seat.

Figure 8:
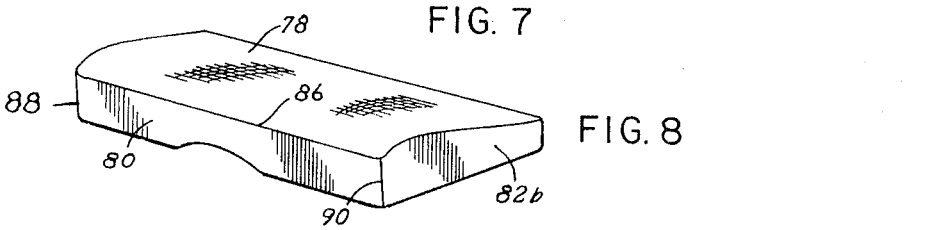
FIG. 8 is a perspective view of the cover assembled from the components of FIG. 7.

After the various panels have been cut and seamed together, as by seams 88 and 90 (FIG. 8) the cover is installed on the cushion in the conventional manner. Again, some slitting of front skirt panel 80 may be desirable to obtain a smooth fit over the central recess in the skirt normally provided for clearance of the transmission tunnel.

From the foregoing description, it is believed apparent that by the use of the present invention, seat covers of custom fitted precision and quality can quickly be fabricated and installed with far less labor required than is the case with custom fitted seat covers made up by conventional techniques. A substantial amount of time and labor on the part of the installer is eliminated by precutting and presewing those panels of the covers where the preassembly will not interfere with the precision of fit. Where processing is not feasible, the various panels are precut to approximate size in rectangular configurations so that the installer does not have to handle and carry heavy bulky bolts of material. By precutting and presewing in the manner described above, a large amount of the cutting and sewing ultimately necessary to achieve the custom fit may be performed on a mass production basis at the factory manufacturing the kit instead of requiring these steps to be performed on a job by job basis at the point of installation. In addition to the increased efficiency in performing a large part of the labor on a mass production basis, the mass production enables a far more efficient pattern layout for cutting the individual panels from the bulk material supplied, resulting in wastage only from the relatively minor trimming operations performed by the installer to fit the covers to the particular car involved.

I claim:

1. An automobile seat cover kit for covering all exposed surfaces of the seat and back cushions of an automobile seat comprising precut and presewn flat panel units of excess outer dimensions for covering those cushions having either a single exposed corner edge or two parallel exposed corner edges, and separate precut flat individual panels for covering all other exposed surfaces of those cushions having exposed three surfaced corners, said separate precut individual panels being of flat rectangular configuration and of overall dimensions slightly exceeding the maximum longitudinal and transverse dimensions of the respective cushion surfaces which the individual panels are to cover.

2. In an automobile seat cover kit for use in covering all exposed surfaces of the upright back cushion of the front seat assembly of an automobile: a precut and presewn flat panel unit having a width exceeding that of said back cushion, said panel unit comprising a flat rectangular main front panel, a flat vertically narrow generally rectangular shoulder panel having a straight horizontal lower edge seamed to the upper edge of said main front panel and a convexly curved upper edge, and a flat rectangular main back panel having an upper edge concavely curved complementary to said upper edge of said shoulder panel and seamed to said upper edge of said shoulder panel; and a pair of separate flat rectangular side panels each having dimensions exceeding the corresponding maximum dimensions of the side surfaces of said cushion.

\* \* \* \* \*